United States Patent [19]

Takahashi

[11] Patent Number: 5,383,730
[45] Date of Patent: Jan. 24, 1995

[54] DOCUMENT PROCESSING APPARATUS THAT MAGNIFIES ONLY BLACK PORTIONS OF CHARACTERS

[75] Inventor: Tsutomu Takahashi, Kanagawa, Japan

[73] Assignee: Canon Kabushiki Kaisha, Tokyo, Japan

[21] Appl. No.: 946,151

[22] Filed: Sep. 17, 1992

Related U.S. Application Data

[63] Continuation of Ser. No. 472,805, Jan. 31, 1990, abandoned.

[30] Foreign Application Priority Data

Jan. 31, 1989 [JP] Japan .................................. 1-21753

[51] Int. Cl.[6] ............................................. B41J 11/44
[52] U.S. Cl. ........................................ 400/76; 395/102
[58] Field of Search ......................... 400/121, 61, 76; 395/102, 110

[56] References Cited

U.S. PATENT DOCUMENTS

| | | | |
|---|---|---|---|
| 4,129,860 | 12/1978 | Yonezawa | 340/731 |
| 4,321,596 | 3/1982 | Hernandez | 340/731 |
| 4,468,141 | 8/1984 | Rosza | 340/731 |
| 4,517,560 | 5/1985 | Murayama | 340/735 |
| 4,573,812 | 3/1986 | Kando | 400/121 |
| 4,630,947 | 12/1986 | Yoshida | 340/731 |
| 4,712,102 | 12/1987 | Troupes | 340/735 |
| 4,740,093 | 9/1988 | Malcolm | 400/121 |
| 4,741,635 | 5/1988 | Shibata | 340/731 |
| 4,881,069 | 11/1989 | Kameda | 340/731 |
| 4,942,390 | 7/1990 | Do | 400/121 |
| 5,016,000 | 5/1991 | Bugg | 340/731 |

FOREIGN PATENT DOCUMENTS

28684  2/1988  Japan .................................. 400/279

*Primary Examiner*—Kimberly L. Asher
*Assistant Examiner*—Steven S. Kelley
*Attorney, Agent, or Firm*—Fitzpatrick, Cella, Harper & Scinto

[57] ABSTRACT

A dot pattern processing apparatus includes a storage device for storing dot patterns, a magnification arrangement for magnifying the dot patterns stored in the storage device in a lateral direction without magnifying a vertical dot string consisting entirely of blank dots in the lateral direction, while magnifying a vertical dot string including at least one black dot in the lateral direction, and an output arrangement for outputting the dot patterns stored in the storage device or the dot patterns magnified by the magnification arrangement, and in which a blank portion between adjacent patterns is not magnified, even dot patterns are magnified, and hence a beautiful result of output can be obtained.

17 Claims, 5 Drawing Sheets

DOCUMENT PROCESSING APPARATUS THAT MAGNIFIES ONLY BLACK PORTIONS OF CHARACTERS

This application is a continuation of application Ser. No. 07/472,805, filed Jan. 31, 1990 now abandoned.

BACKGROUND OF THE INVENTION

1. Field of the Invention

This invention relates to an apparatus for processing documents or the like, for outputting characters using dot patterns (it is to be understood that "character" as used throughout this specification and the appended claims, is not limited to alphanumeric or other writing characters in any narrow sense, but may include any predetermined symbol, whether punctuation marks or other).

2. Description of the Related Art

Typical conventional document processing apparatuses of this kind are word processors, electronic typewriters and the like.

Recently, a dot-matrix-type printing technique used, for example, in thermal printers and ink-jet printers, has made remarkable progress. The quality of characters printed by these printers has become equal to that of printing type.

One of the advantages of the dot-matrix printer is that there are a variety of kinds of print characters. It is possible to print in the kind of character instructed by the operator, for example, Ming-dynasty and Gothic types, and characters magnified in the lateral or vertical direction of these types and the like.

Relative to magnified characters, there has been known a so-called outline font having a data structure in which magnified sizes of character dot patterns can be freely changed. Although this type of font enables large magnified characters to be obtained, it has the disadvantage that it takes time for the expansion of dot patterns. Accordingly, word processors and typewriters have frequently used characters doubled in the lateral direction or characters doubled twice in that direction (so-called 4-multiple characters), in which dot strings in a character dot pattern of a standard character (a full-sized character) are multiplied by an integer in the lateral or vertical direction. These magnified characters have the advantage that magnification of dot patterns is easy, and that the quality of the characters is not lost where the the magnification is relatively small.

However, if the dot pattern of a standard character (termed hereinafter a "full-sized character") is magnified in the lateral direction, there is the disadvantage that right and left blank portions within the dot pattern, that is, pattern portions providing so-called intercharacter blanks, are also magnified in the lateral direction, and hence printed character strings become spaced farther apart.

SUMMARY OF THE INVENTION

It is an object of the present invention to provide a document processing apparatus in which a blank portion between adjacent magnified character patterns is not enlarged when standard character patterns are output after being magnified.

It is another object of the present invention to provide a document processing apparatus in which a blank portion between adjacent magnified character patterns is not enlarged, and hence an unnatural character arrangement does not result, even if standard character patterns are output magnified in the lateral or vertical direction.

It is still another object of the present invention to provide a document processing apparatus in which a blank portion between adjacent magnified character patterns is not enlarged, and hence a beautiful result of printing can be obtained when standard character patterns are output and printed after being magnified.

According to the present invention, a character processor or document processor is provided with means with storing dot patterns, such as character pattern strings, means for magnifying dot patterns from the storage means, and means for outputting dot patterns so magnified. The magnifying means magnifies a dot pattern in a first direction, but does so without magnifying (in that direction) a dot string extending in a second direction and consisting entirely of blank dots, although it does magnify in the first direction a dot string extending in the second direction and including at least one non-blank dot. The first direction can, for example, be either the lateral direction or the vertical direction. The output means can, for example, be a printer or a display unit of any known type that outputs information in the form of dots.

These and other objects, features and advantages of the invention will be more fully appreciated from the following detailed description of the preferred embodiment, taken in conjunction with the accompanying drawings.

DETAILED DESCRIPTION OF THE PREFERRED EMBODIMENT

The preferred embodiment of the present invention will now be explained in detail with reference to the attached drawings.

Figure 1:
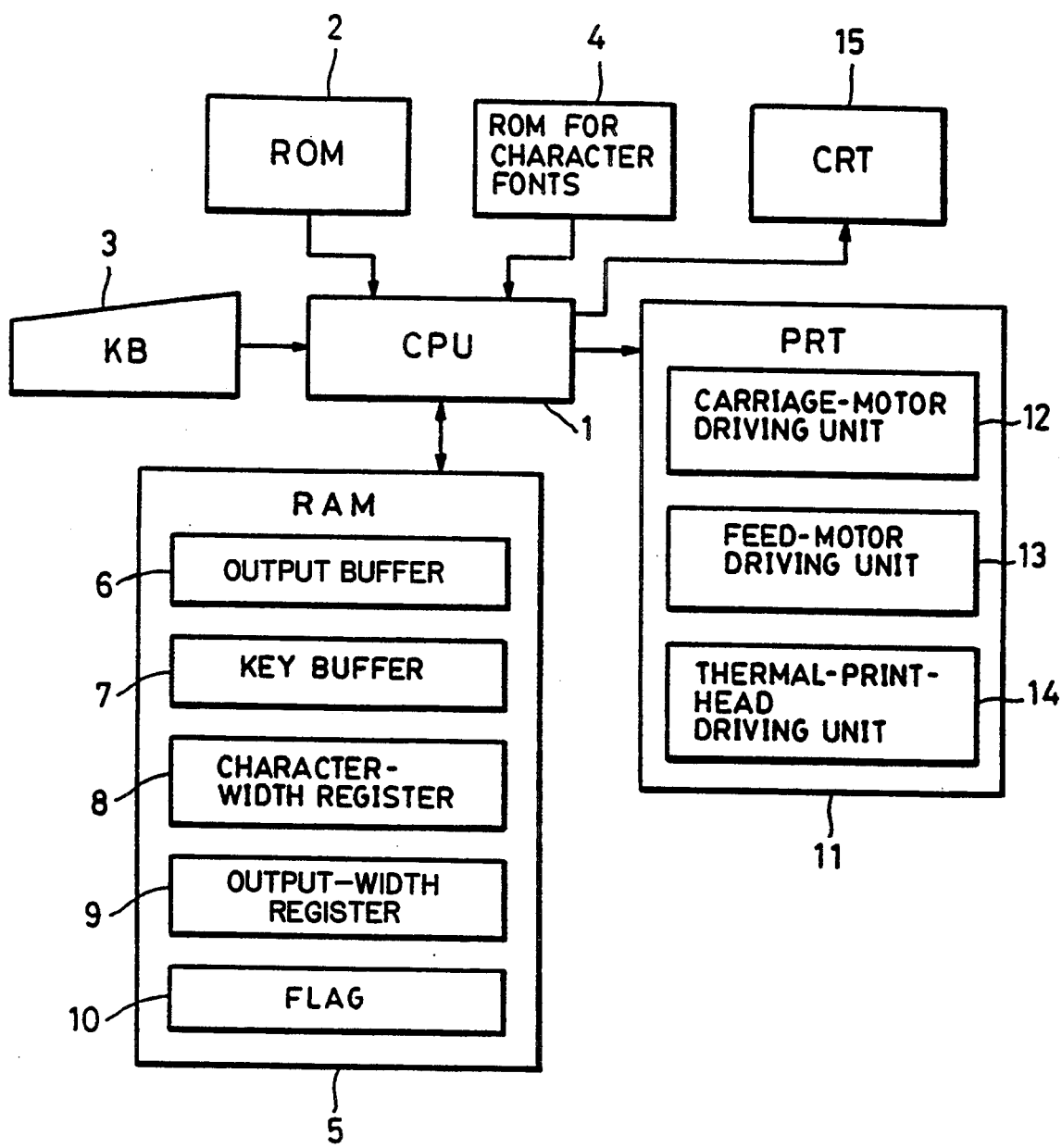
FIG. 1 is a block diagram of the configuration of an electronic typewriter according to the preferred embodiment of the present invention.

FIG. 1 shows the configuration of an electronic typewriter according to the present embodiment. In FIG. 1, a CPU 1 for controlling the entire apparatus functions according to programs (including a flowchart shown in FIG. 4) stored within a ROM 2.

A keyboard 3 includes keys for assigning various kinds of functions (for example, a key for the assignment/release of printing in characters whose size is doubled in the lateral direction, a key for the switching of printing for every character/every line, and the like), in addition to keys corresponding to characters to be printed.

Figure 2:
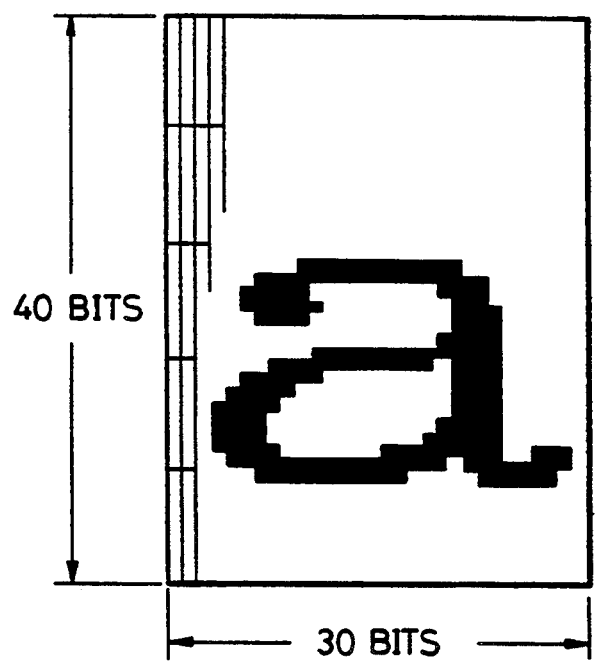
FIG. 2 is a diagram showing the configuration of dots of a full-sized character pattern in the embodiment of FIG. 1.
Figure 3:
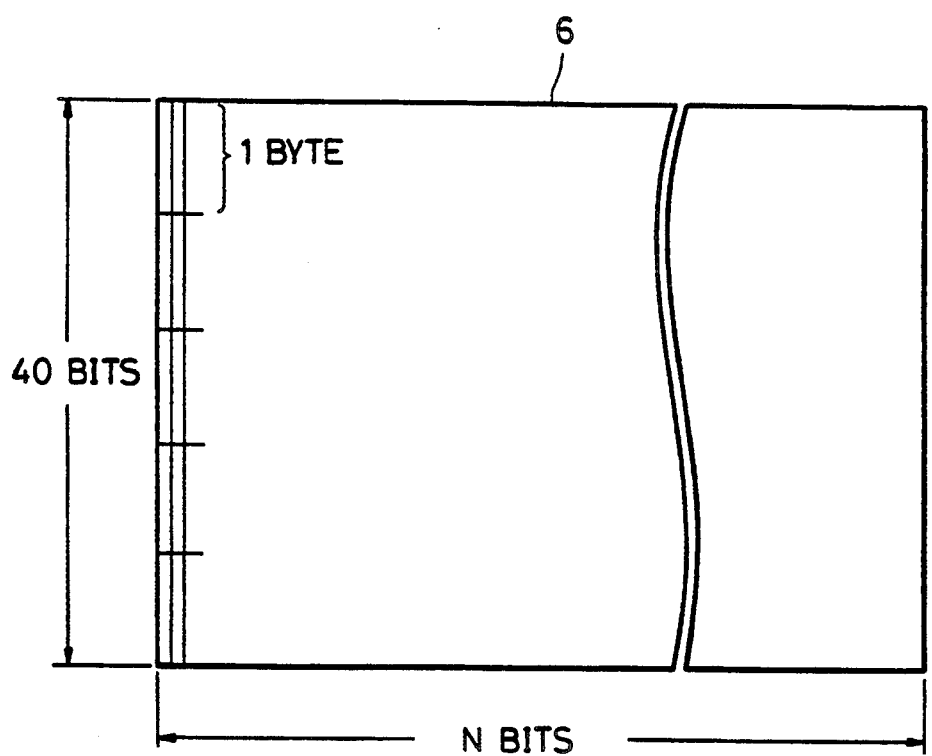
FIG. 3 is a diagram showing an output buffer in the embodiment of FIG. 1.

A ROM 4 for character fonts stores dot patterns constituting various kinds of characters. The ROM 4 stores, for example, a character-font pattern having 40 dots (=5 bytes) in the vertical direction and 30 dots in the lateral direction, as shown in FIG. 2.

A RAM 5 is used as a working area for the CPU 1, and is provided with the areas described below. An output buffer 6 is a buffer which can expand a plurality of full-sized character dot patterns like that shown in FIG. 2, and which has a capacity of $5 \times N$ bytes in total, consisting of 40 bits (=5 bytes) in the vertical direction and N bits in the lateral direction. A keyboard buffer 7 is a buffer for storing one line of character codes input from the keyboard 3. Character dot patterns corresponding to the codes stored in the keyboard buffer 7 are read from ROM 4 for character fonts, and are expanded in the above-described printing buffer 6. A character-width register 8 is a working area for temporarily storing the width (the number of lateral dots) of the character dot patterns read from the ROM 4 for character fonts. An output-width register 9 is a working area for storing the width (the number of lateral dots) of the dots expanded in the output buffer 6, and is added to the output buffer 6 at every expansion. A flag 10 is a flag indicating whether full-sized characters are to be printed or characters doubled in the lateral direction are to be printed, and is set or reset by a switching key on the keyboard 3.

In the present embodiment, an explanation will be provided of a printer 11 by illustrative reference to a thermal print head. In the printer 11, a carriage-motor driving unit 12 moves a carriage mounting a thermal print head in the lateral direction and winds up a ribbon for thermal transfer in accordance with the movement of the carriage. A feed-motor driving unit 13 moves printing paper as a printing medium in the upper and lower directions. A thermal print head driving unit 14 heats each heating element of the thermal print head in accordance with a pattern output from the output buffer 6. A CRT display unit 15 can display dot patterns.

Figure 4:
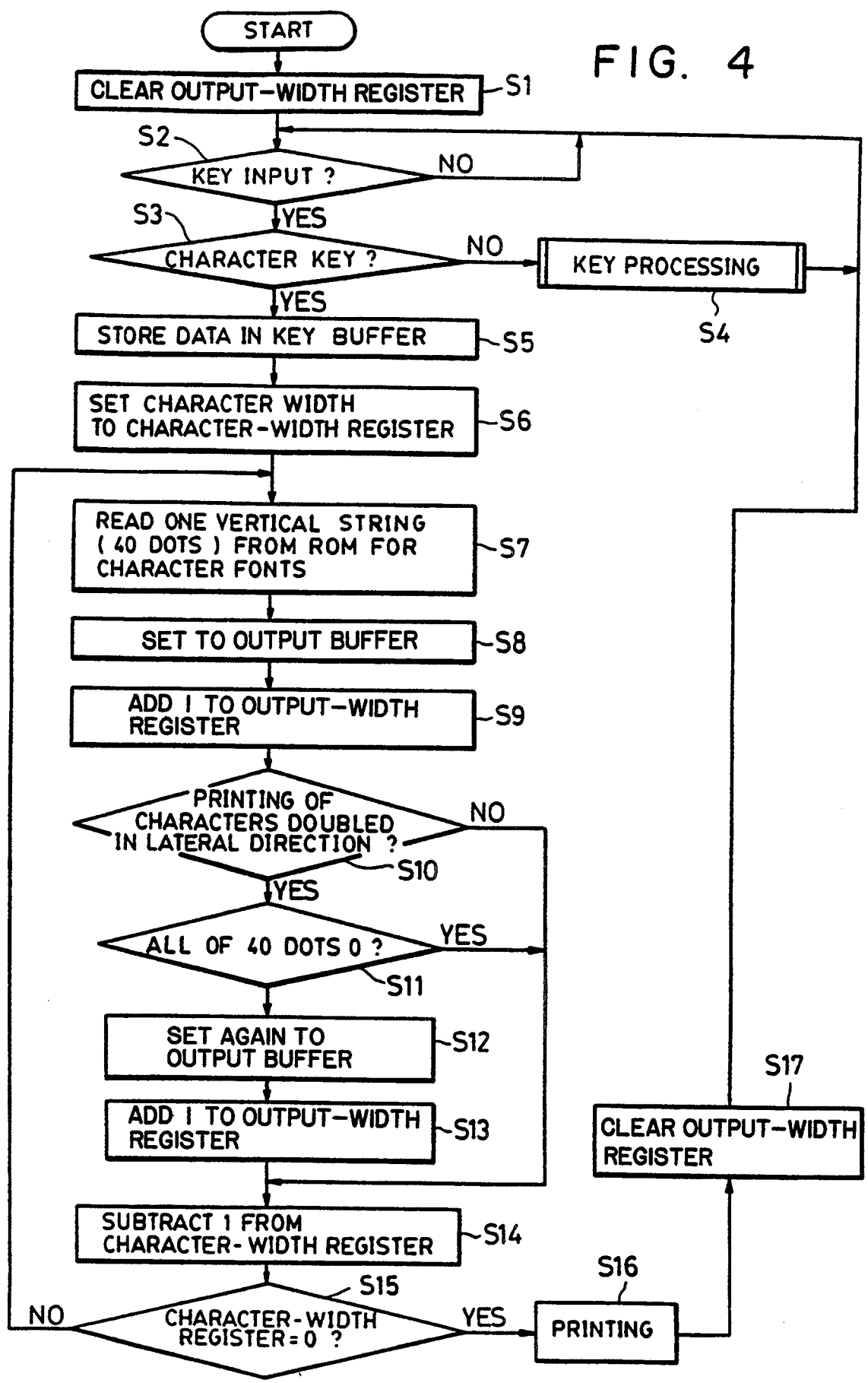
FIG. 4 is a flow chart showing a processing procedure for a CPU in the embodiment of FIG. 1.

The operation in the above-described configuration of the present embodiment will now be explained with reference to the flowchart shown in FIG. 4.

First, the output-width register 9 is cleared at step S1, and the program waits until there is an input from the keyboard 3 at step S2. If there is a key input, the process proceeds to step S3, where it is determined whether or not the input data are from a character key. If the input data are not from a character key, the process proceeds to step S4, where a processing corresponding to the proper key is performed, though not illustrated. If the input data are, for example, from a switching key which selects between printing of full-sized characters and printing of characters doubled in the lateral direction, the flag 10 is inverted (if the flag is "0", the flag is inverted to "1", and if the flag is "1", the flag is inverted to "0"). If it is determined that the input data are from a character key at step S3, the process shifts to the next step S5, where the data are stored in the key buffer 7. Subsequently, at step S6, the width of a character (=30 dots) is set in the character-width register 8. At steps S7–S15, character patterns corresponding to the data are read from the ROM 4 for character fonts, and are set in the output buffer 6.

At step S7, one vertical string (40 dots =5 bytes) in the character dot patterns is read from the ROM 4 for character fonts, and is set in the output buffer 6 at step S8. At step S9, 1 is added to the contents of the output-width register 9.

Next, the flag 10 is checked at step S10. In the case of printing of characters doubled in the lateral direction, the process proceeds to step S11. In other cases, the process proceeds to step S14. At step S11, it is determined whether or not the dot pattern of the one vertical string read at step S7 consists of all 0's. If not all 0's, the dot pattern is set again to the output buffer 6 at step S12, and 1 is added to the contents of the output-width register 9 at step S13. If the dot pattern of the one vertical string consists of all 0's in the determination at step S11, steps S12 and S13 are skipped, and the process proceeds to step S14.

Accordingly, if the vertical dot string does not consist of all 0's in the printing of characters doubled in the lateral direction, the dot pattern is set twice in the output buffer 6. If the vertical dot column consists of all 0's, the dot pattern is set only once in the output buffer 6. Hence, only a character dot portion is doubled in the lateral direction, and a blank portion corresponding to an intercharacter blank is not doubled.

At step S14, 1 is subtracted from the contents of the character-width register 8. At step S15, it is determined whether or not the contents of register 8 become 0, and steps S7–S15 are repeated until the contents of register 8 do become 0. When the entire dot pattern for one character has been set in the output buffer 6, the contents of character-width register 8 become 0, and the process returns to step S16. At step S16, data for dots of the width of the output-width register 9 set in the output buffer 6 are printed by driving the carriage-motor driving unit 12 and the thermal-print-head driving unit 14. The output-width register 9 is then cleared at step S17, and the process returns again to step S2, from which the processing is repeated.

According to the above-described processing, it becomes also possible to print characters doubled in the lateral direction with the same width intercharacter blank as in the case of the full-sized characters, without magnifying the blank portion between adjacent characters.

Figure 5:
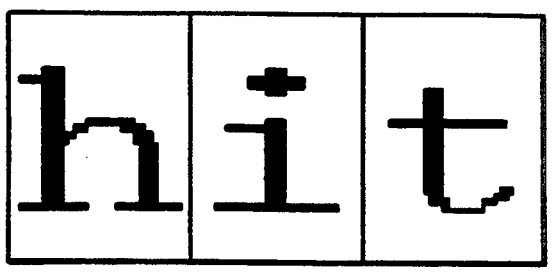
FIG. 5 is a diagram showing an example of printing of a full-sized character in the embodiment of FIG. 1.
Figure 6:
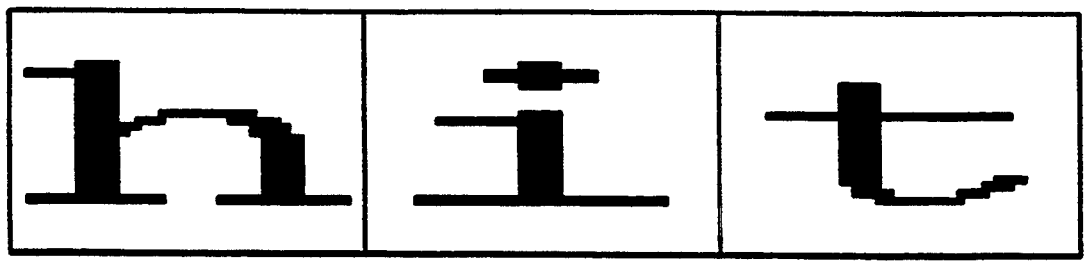
FIG. 6 is a diagram showing an example of printing when the character string shown in FIG. 5 is printed in characters doubled in the lateral direction by a conventional technique.
Figure 7:
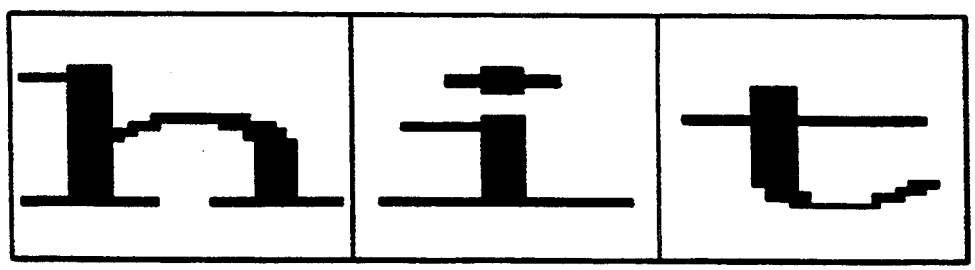
FIG. 7 is a diagram showing an example of printing when the character string shown in FIG. 5 is printed in characters doubled in the lateral direction using the technique of the present invention.

FIG. 5 shows an example of printing when a word "hit" is printed in full-sized characters. FIG. 6 shows an example of printing when the word is printed in characters doubled in the lateral direction without performing the processing shown in FIG. 4. FIG. 7 shows the result of printing the word with characters so doubled, when the processing of FIG. 4 according to the present invention is performed.

Although, in the above-described processing, a case in which characters are printed one by one for every depression of a character key has been shown, the present invention is not limited thereto. Printing line by line in which printing is performed by depressing a return key, for example, can be easily realized by adding the processing of steps S16 and S17 in FIG. 4 to the processing of the return key at step S4. Furthermore, although, in the above-described embodiment, a case of application to an electronic typewriter has been explained, the present invention is not limited thereto either. The present invention may also be applied, for example, to a document processing apparatus in which a document or other set of characters is processed, e.g., edited, output and displayed and/or printed, such as a word processor, without any problem. In this case, the present invention can be achieved, for example, if the printer side receives and discriminates a control code corresponding to actuation of the switching key in the preferred embodiment.

In addition, although, in the above-described embodiment, an explanation has been provided of a case of characters doubled in the lateral direction, it is apparent that the present invention may also be applied to large magnified characters, such as 4-multiple or 9-multiple characters, or characters reproduced on output with any desired magnification in various directions, e.g., either a lateral direction or a vertical direction.

As explained above, according to the present invention, a blank portion between adjacent characters is not magnified even when character dot patterns are magnified in the lateral direction, and hence it becomes possible to provide a beautiful result of printing.

While the present invention has been illustratively described by reference to the details of the preferred embodiment, many variations and modifications will be apparent to those of skill in the art, and the scope of the invention is therefore not to be limited by the details of the described embodiment, but is defined by the terms of the appended claims.

What is claimed is:

1. A document processing apparatus comprising:
   storage means for storing dot patterns;
   check means for checking whether a column of said dot patterns consists of all non-print dots;
   magnification means for magnifying said dot patterns stored in said storage means in a lateral direction in response to a result of checking provided by said check means, without magnifying a vertical dot string consisting entirely of blank dots in the lateral direction and with magnifying a vertical dot string including at least one black dot in the lateral direction; and
   output means for outputting the dot patterns stored in said storage means or the dot patterns magnified by said magnification means.

2. A document processing apparatus according to claim 1, wherein said output means comprises a printer.

3. A document processing apparatus according to claim 1, wherein said output means comprises a display unit.

4. A document processing apparatus according to claim 1, wherein the dot patterns stored in said storage means comprise character patterns.

5. A document processing apparatus according to claim 1, wherein said storage means has an area for storing the dot pattern including a dot string consisting entirely of blank dots.

6. A document processing apparatus according to claim 1, further comprising instruction means for instructing magnification regarding the dot pattern.

7. A dot pattern processing apparatus comprising:
   storage means for storing dot patterns, said dot pattern having matrix structure;
   check means for checking whether one column of said matrix consists of all 0's;
   magnification means for magnifying the dot patterns stored in said storage means in a first direction in response to said check means, without magnifying in the first direction a dot string extending in a second direction and consisting entirely of blank dots while magnifying in the first direction a dot string extending in the second direction and including at least one non-blank dot; and
   output means for outputting the dot patterns magnified by said magnification means.

8. A dot pattern processing apparatus according to claim 7, wherein said output means comprises a printer.

9. A dot pattern processing apparatus according to claim 7, wherein said output means comprises a display unit.

10. A dot pattern processing apparatus according to claim 7, wherein said first and second directions are perpendicular to each other.

11. A dot pattern processing apparatus according to claim 7, wherein said first direction is lateral.

12. A dot pattern processing apparatus according to claim 7, wherein said first direction is vertical.

13. A dot pattern processing apparatus according to claim 7, or 10, wherein the dot patterns stored in said storage means comprise character patterns.

14. A dot pattern processing apparatus according to claim 7, wherein said storage means has an area for storing the dot pattern including a dot string extending in a second direction and consisting entirely of blank dots.

15. A dot pattern processing apparatus according to claim 7, further comprising an instruction means for instructing magnification to be performed on the dot pattern.

16. A method for processing a dot pattern comprising the steps of:
    reading a dot pattern from a memory in which the dot pattern is stored;
    checking whether one string of said dot pattern consists of all 0's;
    magnifying the dot pattern from the memory in a first direction in response to said checking step, without magnifying in the first direction a dot string extending in a second direction and consisting entirely of blank dots, while magnifying in the first direction a dot string extending in the second direction and including at least one non-blank dot; and
    outputting the dot pattern magnified in said magnifying step.

17. A method according to claim 16, further comprising the step of instructing whether the dot pattern read from the memory is to be magnified or not.

* * * * *